June 27, 1961 A. ABOLINS 2,990,194
RETRACTABLE LANDING GEAR
Filed June 6, 1960 3 Sheets-Sheet 1
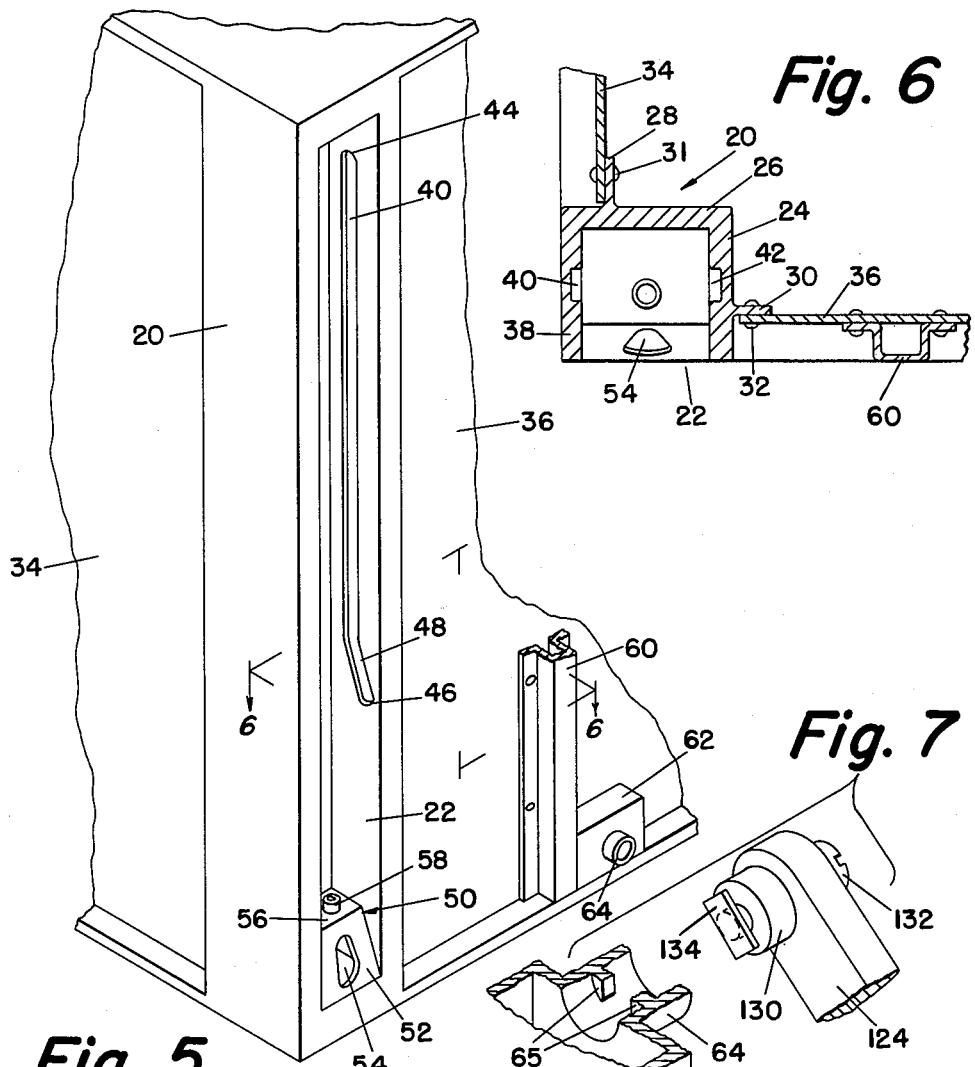
INVENTOR.
ANDREW ABOLINS
BY Max R. Millman
ATTORNEY

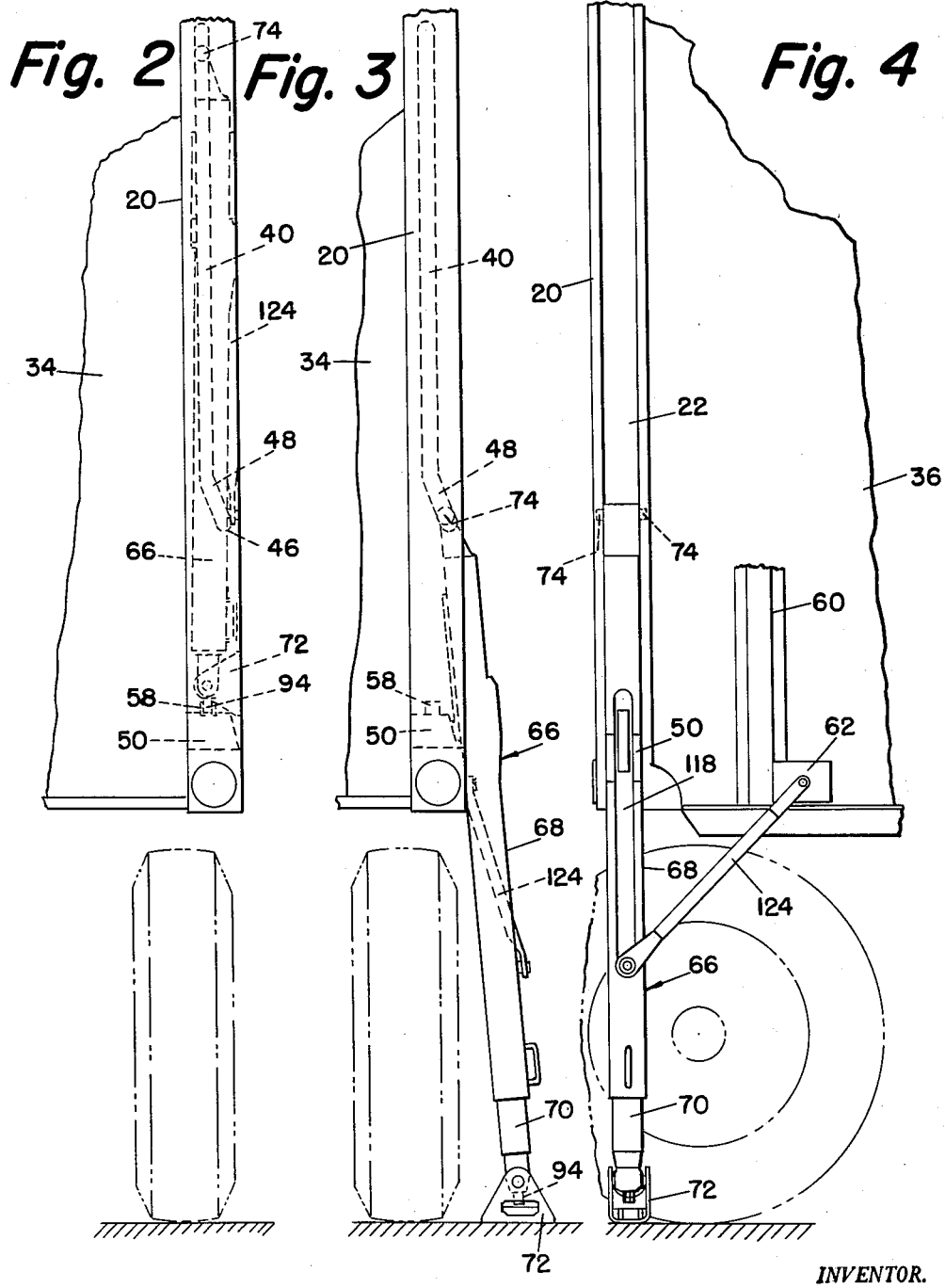

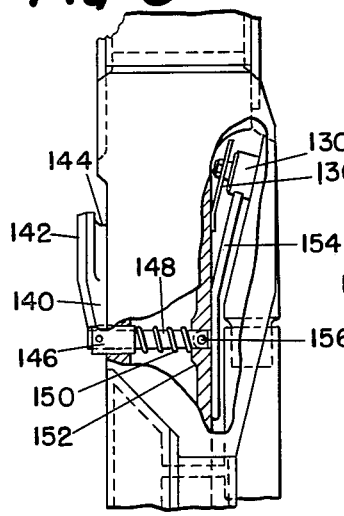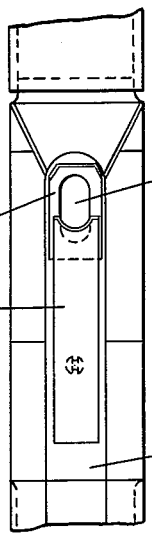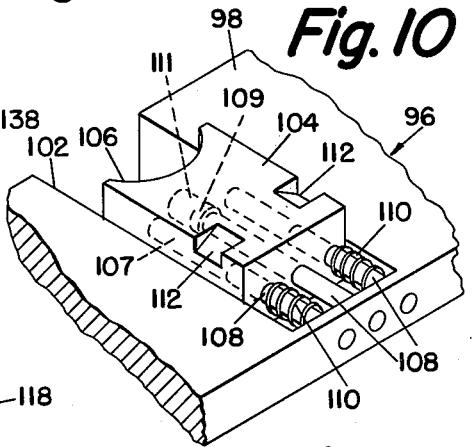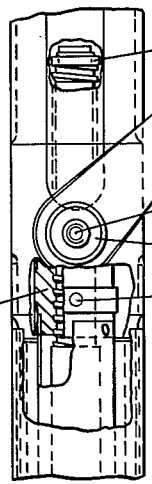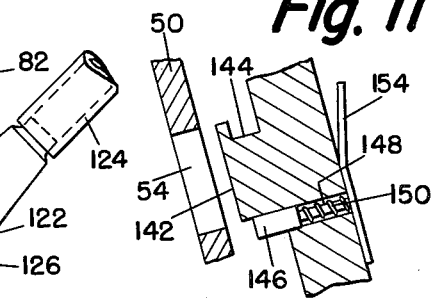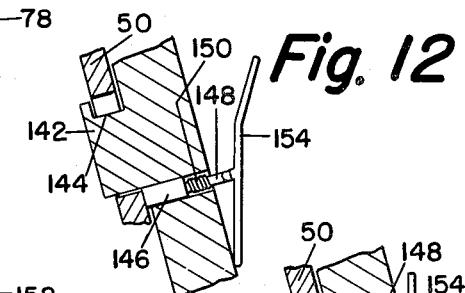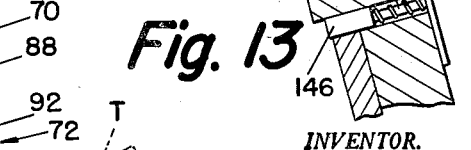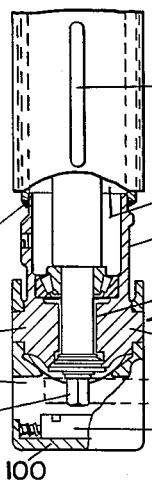

United States Patent Office 2,990,194
Patented June 27, 1961

2,990,194
RETRACTABLE LANDING GEAR
Andrew Abolins, Penndel, Pa., assignor to Strick Trailers, a division of Fruehauf Trailer Co., Philadelphia, Pa., a corporation of Michigan
Filed June 6, 1960, Ser. No. 34,241
16 Claims. (Cl. 280—150.5)

This invention relates to landing gears for use with vehicles, such as semi-trailers, the primary object of which is to provide a construction whereby the loading gears are readily and fully retractable into vertically extending corner members in the vehicle and there stored when inoperative.

In modern transportation systems it is desirable at times to couple semi-trailers horizontally and transport the coupled bodies as a unit by means of a single prime mover. To properly effect the coupling of the bodies with possible damage to the bodies or couplers reduced to the very minimum, the bodies must be horizontally aligned as one is moved into coupling position with the other. It is another object of the invention to provide landing gears of the character described which are readily adjustable in height, thereby permitting effective horizontal alignment of the bodies to be coupled.

Another object of the invention is to provide a retractable landing gear of the character described including a vertically adjustable leg, a brace and a foot so interconnected as to be storable as a unit into the vertical corner member of the vehicle or container, there being an easily operable means to releasably attach the free end of the brace to a portion of the vehicle or container when the leg is in its operative or supporting position.

Another object of the invention is to provide a vertically adjustable and retractable landing gear equipped with manually releasable means for securing and for bracing the landing gear on the vehicle or container when in its operative or load supporting position.

Yet another object of the invention is to provide a retractable and vertically adjustable landing gear wherein the adjustment is effected by a jack screw, there being a releasable latch means for readily retaining a tool on the jack screw permitting ease of operation of the screw.

These and other objects of the invention will become more apparent as the following description proceeds in conjunction with the accompanying drawings, wherein:

FIG. 1 is a diagrammatic view illustrating the coupling of vehicle bodies employing the landing gears of the instant invention;

FIG. 2 is a fragmentary front elevational view of a vehicle body showing the landing gear in the retracted or stored position;

FIG. 3 is a view similar to FIG. 2 showing the landing gear in its operative or supporting position;

FIG. 4 is a side view of the vehicle looking to the left of FIG. 3;

FIG. 5 is a fragmentary perspective view of a front corner of the vehicle with the landing gear removed;

FIG. 6 is a sectional view taken in the plane of 6—6 of FIG. 5;

FIG. 7 is a fragmentary group perspective view of the free end of the brace and the means to releasably couple the same to the body;

FIG. 8 is an enlarged fragmentary front view of the landing gear leg and brace with the latter in its non-bracing position;

FIG. 9 is an enlarged fragmentary side view of the landing gear and brace with the latter extended into its bracing position;

FIG. 10 is a perspective view of the latch means for the jack screw operating tool;

FIGS. 11–13 are vertical sectional diagrammatic views of portions of the landing gear leg and vehicle body corner member illustrating the steps in releasably securing the landing gear leg to the corner member in the operative or support position of the leg.

Specific reference is now made to the drawings wherein similar reference characters are used for corresponding elements throughout.

The retractable landing gear 10 of the instant invention is generally applicable to any device requiring load support for a given time but is especially adapted for use with a container in the form of a semi-trailer 12 adapted to be coupled horizontally by suitable means 14 to another semi-trailer 16. In practice the front semi-trailer 16 which is attached to a fifth wheel or prime mover 18 is backed up towards the front of the rear semi-trailer 12 while the latter is supported on its running gear and on the landing gears 10 and until the couplers 14 engage in suitable socket members in the rear of the front trailer 16. Since substantial force is required to effect the coupling, the trailer bodies and more particularly the couplers 14 and the socket members into which they enter must be horizontally aligned otherwise serious damage may result to the socket members and the trailer bodies. For this reason, the landing gears are equipped with vertical adjustment means as will appear hereinafter. After coupling is effected and the bodies are horizontally connected, the landing gears are retracted and stored in corner members in the body, as will appear hereinafter, where they are readily accessible for re-use when the bodies are to be uncoupled.

Coming first to the corner members 20 as seen in FIGS. 2–6, it will be seen that there are two of them which extend vertically of the front corners of the vehicle body or container approximately the full height thereof. The corner member is substantially U-shaped in cross section as seen in FIG. 6, the outer side wall thereof being open as at 22. The rear wall 24 and the inner side wall 26 of the corner member include flanges 28 and 30 to which are secured as at 31 and 32 the front and side panels 34 and 36 of the body. The front wall 38 and the rear wall 24 of the corner member contain longitudinal grooves 40 and 42 each terminating as at 44 adjacent the upper end of the corner member. The lower end 46 of each groove is also closed and terminates a predetermined distance above the lower end of the corner member, the groove including a portion 48 which inclines downwardly and towards the open outer side wall 22.

At its lower end the longitudinal corner member 20 includes a hollow box-like member 50, preferably cast, having an inclined side wall 52 facing the open side 22 of the corner member, a generally oval-shaped opening 54 therein, an upper wall 56 generally perpendicular to the longitudinal axis of the corner member and a socket or short pipe member 58 upstanding therefrom, all for a purpose soon to appear. Adjacent one of the vertical posts 60 secured to an underframe (not shown) behind the side panels 36 of the body and at a predetermined location, a plate 62 is provided towards the bottom of the body, the same including a horizontally extending socket member or short pipe section 64 having opposed internal fingers 65.

The landing gear leg is indicated at 66 and shown in greater detail in FIGS. 8–13. The leg is generally rectangular in cross section and includes an upper member 68, all or a lower portion of which is tubular and a lower hollow member 70, a portion of which is telescopingly received therein, there being a ground-engaging foot 72 pivoted to the lower member 70. The upper end of the leg is provided with oppositely disposed, laterally extending pintles 74 which are slidably engaged in the opposed longitudinal grooves 40 and 42.

Keyed in the upper leg portion 68 by any appropriate means as by diametrically opposed set screws 78 is an internally threaded nut 80 in which is threaded a longitudinal jack screw 82 which extends through the lower member 70. The foot 72 is in the form of a generally U-shaped member having spaced arms 84. Secured as at 86 to the lower end of the lower member 70 is a unit 88 the lower portion of which includes diametrically opposed pintles 90 which are rotatably received in apertures in the arms 84 thereby pivoting the foot 72 on the landing gear leg. The unit 88 serves to rotatably journal and retain as at 92 the lower end of the jack screw 82, the free end thereof being squared as at 94 and extends beyond the unit 88.

Thus by rotating the jack screw the relative positions of the upper and lower leg portions 68 and 70 are altered to effect a vertical adjustment of the landing gear. Any suitable rachet-like socket wrench or tool T may be made to engage the square end 94 of the jack screw and a latch means 96 is provided to assist in releasably retaining the wrench in place. This means comprises a portion 98 which extends between the arms 84 of the foot 72 and is upstanding from the web plate 100, this portion 98 including a lateral guideway 102 in which slides a latch bar 104. The latch bar 104 has a free arcuate end 106 and an opposite end equipped with bores 107 to slidably receive three pins 108 which are in turn secured to one of the arms 84, the two outer pins mounting springs 110. The central pin 108 includes an enlarged head 109 engageable with a shoulder formed by a counter-bore 111 to prevent the latch bar 104 from becoming disengaged from the pins. The springs terminally abut the latch bar 104 and the end of the guide plate 98 urging the latch bar away from said one arm 84 towards the opposite arm. The upper edges of latch bar 104 near the face mounting the pins 108 include notches 112. Large openings 114 are provided in each arm 84 of the foot 72. When the head of the wrench T is inserted through one opening 114, it engages the arcuate surface 106 and pushes the latch bar 104 back until its socket aligns with the square end 94 of the jack screw. When the wrench is then raised so that the socket thereof actually engages the end 94 of the jack screw, the springs 110 urge the latch bar 104 to under-ride the wrench head and hold it in place during operation thereof to turn the jack screw as shown in FIG. 9. To remove the wrench, the operator inserts his fingers through one of the openings 114 of the foot, engages the notches 112 and pulls back the latch bar until the wrench is free to be disengaged from the square end 94 of the jack screw.

At a predetermined position, the upper portion 68 of the leg is provided with a boss 116 forming a bore opening through one face thereof and into a longitudinal groove 118 of predetermined length. Removably but nonrotatably retained in the boss by a set screw 120 is a stud 122. A brace rod 124 is provided having an opening in one end in which is pressed a rod end bearing 126 whereby said one end of the brace rod is received on the stud and retained by a snap ring 128 so that said one end of the brace rod is universally pivoted on the stud 122.

The other or free end of the brace rod includes a means for releasably attaching it to the plate 62 when operative or to the landing gear leg when inoperative so that it may be stored in the corner member with the leg. An illustrative means includes a stud 130, see FIG. 7, in which is mounted a rotatable plug 132 which is slotted to receive a screw driver, coin, etc. The plug includes a cross member or latch 134 at its inner end. Welded or otherwise secured to one face of the upper leg member 68 is a keeper plate 136 having an elongated slot 138 somewhat larger than the latch 134, the length of the latch exceeding the width of the slot. Thus, when the latch is aligned with the slot and passes therethrough and the plug 132 is rotated, the latch traverses the slot and retains the brace on the leg. In this position of storage, the brace 124 which is generally circular in cross section enters the longitudinal groove 118.

In the operative position, the stud 130 is made to enter the socket or pipe member 64 with the cross member or latch 134 disposed vertically between the fingers 65. Rotation of the plug 90° from its entering position will effect a releasable latching operation as the latch will engage behind the fingers 65 which are spaced a distance less than the length of the cross member or latch 134 but greater than the width thereof. A suitable detent means (not shown) may be used to index the cross member 134 in both positions.

In the operative or support position of the landing gear leg, a means is provided to releasably but firmly secure an intermediate portion of the leg to the container or vehicle body. This means includes a lug 140 extending from the face of the upper leg section which is opposite the face to which the brace 124 is pivoted, the lug 140 including an enlarged head 142 whose shape is the same as but whose size is somewhat less than the hole 54 in the lower box-like member 50. The remainder of the lug 140 is reduced in diameter thereby forming a notch 144 behind the head 142. Immediately beneath the lug 140 the leg includes a lateral bore in which a plunger is slidably received, the same including an enlarged portion 146 and a reduced portion 148, there being a spring 150 around the portion 148 between the portion 146 and a shoulder 152 in the landing gear leg. The spring urges the head 146 of the plunger towards the lug 142 or to the left of FIGS. 8, 9, 11–13. An angulated finger bar 154 is pivoted as at 156, preferably by a yoke arrangement, intermediate its ends to the end of the plunger opposite its head 146. A handle 158 is provided at the lower end of the upper leg section 68.

The landing gear is employed as follows. With the brace 124 in the groove 118 of the leg and attached to the leg via the latch 134 and keeper 136 and with the foot 72 turned up to a position in which the web 100 thereof is generally parallel to the leg, the latter can be retracted by the handle 158 and stored in its entirety within the corner member 20 through the open side 22 thereof. In the storage position the pintles 70 are disposed towards the upper end 44 of the slots 40 and 42 and the square lower end 94 of the jack screw is received in the socket or pipe member 58 upstanding from the lower box-like member 50.

In the operative position of the landing gear, the same is withdrawn from the corner member by raising it via the handle 158 until the square end 94 of the jack screw is free of the socket 58 and then lowering the leg as the pintles 70 ride down the slots 40 and 42 until they enter the forwardly inclined portions 48 and reach the lower ends 46 of the slots. Thereafter the leg is pushed towards the corner member whereupon the lug 140 enters the hole 54 in the side wall 52 of the member 50. As seen in FIGS. 11 and 12, the head 146 of the plunger strikes the side wall and is retracted. However, when the leg is raised slightly so that the notch 144 of the lug engages the edge of the hole 54, the head 146 of the plunger is free to enter the hole 54 and is urged therein by the spring 150. In this condition the lug 140 is coupled to the lower box-like member 50.

Thereafter the brace 24 is disconnected from the keeper 136 and is connected to the plate 62 via the latch 134 which is made to engage in the socket member 64 in the plate. The ratchet-type tool T with a socket head is then inserted into the foot through the opening 114, the tool pushing the latch bar 104 back until its socket head aligns with the square end 94 of the jack screw whereupon engagement of the socket head with the end 94 will allow the latch bar 104 to snap back and retain the tool in its engaged position. Reciprocation of the tool will lower the foot 72 until it engages the ground and until the height of the leg is adjusted as desired.

To place the landing gear leg in condition for retraction and storage in the corner member, the lower section 70 of the leg is raised by jack operation to its fully retracted position and the brace is detached from the plate 62 and re-attached to the keeper 136 carried by the leg itself. Then finger pressure is exerted outwardly on the bar 154 until the head 146 of the plunger is completely withdrawn from the hole 54 whereupon the leg is lowered until the head 142 of the lug 140 can clear the hole 150 as shown in FIG. 12. Finally the entire unit is raised and stored in the corner member as previously described.

While a preferred embodiment of the invention has here been shown and described, a skilled artisan may make variations without departing from the spirit of the invention and the scope of the appended claims.

I claim:

1. In combination with a container having at least one vertically extending member opening over its major length through the side thereof, a landing gear comprising a vertically extending leg, means mounting the upper end of said leg in said member for vertical movement thereof, the full length of said leg being capable of confinement in said member in its retracted inoperative position, said leg being movable to the retracted position through said side opening, means removably retaining said leg in said member in said retracted inoperative position and means releasably attaching an intermediate portion of said leg to said container adjacent the lower end of said member when the said major portion of said leg is withdrawn from said member and is in an operative load supporting position.

2. The combination of claim 1 wherein said member is substantially U-shaped in cross-section and said means mounting the upper end of said leg in said member includes vertically extending slots in the opposed walls of said member and laterally extending pintles carried by said leg and slidably retained in said slots.

3. The combination of claim 1 wherein said last-named means includes a lug extending laterally from said intermediate portion of said leg, said container including a portion at the lower end of said member including an opening to receive said lug, and latch means releasably coupling said lug to said container in said opening.

4. The combination of claim 3 wherein said lug includes a notch adapted to receive an edge of said portion at the lower end of said member around said opening when said leg is raised after said lug enters said opening, said latch means comprising a spring urged plunger carried by said leg and adapted to enter said opening beneath said lug when said notch receives said edge.

5. The combination of claim 4 and a bar pivoted intermediate its ends to said plunger and operable by pulling force applied thereon to retract said plunger from said opening.

6. The combination of claim 1 and means to continually adjust the height of said leg.

7. The combination of claim 6 wherein said leg comprises upper and lower telescoped sections, said height adjustment means including a nut keyed in said upper section and a screw jack received in said nut extending through and rotatably mounted on said lower section.

8. The combination of claim 1 and a ground-engaging foot pivoted to the lower end of said leg, said foot being movable to a position whereby it can be confined with said leg as a unit in said member in the inoperative or storage position of the leg.

9. The combination of claim 7 and a ground-engaging foot pivoted to the lower end of said leg, said foot being movable to a position whereby it can be confined with said leg as a unit in said member in the inoperative or storage position of the leg.

10. The combination of claim 9 wherein said foot is substantially U-shaped having spaced arms pivoted to the lower end of said leg, the lower end of said jack screw extending into said foot between said arms, said means removably retaining said leg in said member in the retracted inoperative position thereof including a socket element upstanding into the lower end of said member and receiving the lower end of said jack screw.

11. The combination of claim 9 wherein said foot is substantially U-shaped having spaced arms pivoted to the lower end of said leg, the lower end of said jack screw extending into said foot between the arms thereof, and latch means carried by said foot to releasably retain an operating tool in engagement with said lower end of said jack screw.

12. The combination of claim 11 wherein one of said arms includes an opening adapted to receive a portion of an operating tool, said latch means including a bar slidably mounted between said one and the other of said arms and spring means urging said bar towards said one arm.

13. The combination of claim 1 and an elongated brace pivoted at one of its ends to said leg, means to releasably attach the other end of said brace to said container adjacent said member when said leg is in its operative load supporting position and means to releasably attach said other end of said brace of said leg whereby said leg and brace can be confined as a unit in said member in the inoperative or storage position of said leg.

14. The combination of claim 13 and a ground-engaging foot pivoted to the lower end of said leg and movable to a position whereby it together with said brace and leg can be confined as a unit in said member in the inoperative or storage position of said leg.

15. The combination of claim 13 wherein said means to releasably attach said brace to said container comprises a keeper extending outwardly of said container and a latch member carried by the other end of said brace releasably engageable with said keeper.

16. The combination of claim 13 wherein said means to releasably attach the other end of said brace to said leg includes a keeper carried by said leg at a predetermined position and a latch member carried by the other end of said brace releasably engageable with said keeper, said leg including a longitudinal groove receiving the major length of said brace when said means functions to attach the other end of said brace to said leg.

References Cited in the file of this patent

UNITED STATES PATENTS

| | | |
|---|---|---|
| 2,606,057 | Johnson | Aug. 5, 1952 |
| 2,956,699 | Payne | Oct. 18, 1960 |